US 6,318,697 B1

United States Patent
Corrado et al.

(12) United States Patent
(10) Patent No.: US 6,318,697 B1
(45) Date of Patent: Nov. 20, 2001

(54) AOS SENSOR MIRROR MOUNT ASSEMBLY

(75) Inventors: Anthony P. Corrado, Clarkston, MI (US); Tomas Lehntz, Braunschweig (DE)

(73) Assignee: Robert Bosch Corporation, Farmington Hills, MI (US)

( * ) Notice: Subject to any disclaimer, the term of this patent is extended or adjusted under 35 U.S.C. 154(b) by 0 days.

(21) Appl. No.: 09/079,247

(22) Filed: May 14, 1998

(51) Int. Cl.[7] ............................. A47G 1/16; G02B 7/182
(52) U.S. Cl. ..................... 248/475.1; 248/549; 359/871; 280/735
(58) Field of Search ................................ 248/466, 467, 248/475.1, 476, 479, 481, 484, 483, 485, 486, 549; 359/871, 872; 280/735

(56) References Cited

U.S. PATENT DOCUMENTS

| | | | |
|---|---|---|---|
| 2,989,897 | * 6/1961 | Bertell et al. | 248/484 |
| 3,120,369 | * 2/1964 | Gray, Jr. | 248/467 X |
| 4,254,931 | * 3/1981 | Aikens et al. | 248/483 X |
| 4,848,888 | * 7/1989 | Polzer | 248/549 X |
| 4,883,349 | * 11/1989 | Mittelhauser | 248/475.1 X |
| 4,899,975 | * 2/1990 | Suman | 248/481 |
| 5,151,828 | * 9/1992 | Sugimura | 248/481 X |
| 5,412,511 | * 5/1995 | Beinhauer | 248/481 X |
| 5,482,314 | 1/1996 | Corrado et al. | 280/728 |
| 5,653,462 | * 8/1997 | Breed et al. | 280/735 |
| 5,702,123 | * 12/1997 | Takahashi et al. | 280/735 |
| 5,871,232 | * 2/1999 | White | 280/735 |

FOREIGN PATENT DOCUMENTS

| 689871 | * 6/1964 | (CA) | 248/467 |
|---|---|---|---|
| 1237508 | * 8/1971 | (GB) | 248/476 |

* cited by examiner

*Primary Examiner*—Anita King
(74) *Attorney, Agent, or Firm*—Innovation Law Group, Ltd.; Jacques M. Dulin

(57) ABSTRACT

An automobile rearview mirror mount assembly adapted to mount sensors and wiring for automotive occupancy sensing (AOS) systems for sensing the nature or type of occupant and the location of the occupant with respect to the vehicle interior, particularly AOS systems employing Keep-Out-Zone-Incursion (KOZI) sensors. The mirror mount assembly provides a protected conduit for AOS wiring independent of the windshield, allowing windshield replacement without the removal or possible damage to the wiring. The mirror mounting assembly is characterised by a elongated cantilevered arm extension of the mirror mount, the arm being pivoted from the vehicle roof or a roof- or header-mounted AOS console, The mirror mounting assembly includes a bracket incorporating one or more AOS sensor(s), preferably a Keep-Out-Zone-Incursion (KOZI) sensor(s). The cantilevered arm carries the electronic connections linking the sensors to the AOS system. The mirror mount assembly is also fixed to the windshield by a zero-force attachment assembly which permits the mounting assembly to be detached and pivoted away from the windshield for windshield maintenance or replacement without compromising the electronic connections. The two point attachment, one end being pivoted, permits precise location and alignment of the sensors so they look at the proper predetermined zone of the vehicle, e.g., a KOZI or the vehicle seat.

20 Claims, 4 Drawing Sheets

AOS SENSOR MIRROR MOUNT ASSEMBLY

TECHNICAL FIELD

The invention relates to sensor mounting installations for automotive occupancy sensing (AOS) systems for sensing the nature or type of occupant and the location of the. occupant with respect to the vehicle interior, and more particularly to an automobile rear-view mirror mounting assembly for AOS sensors, particularly those monitoring Keep-Out-Zones (KOZ). The assembly is characterised by a cantilevered arm extension of the mirror mount, the 15 arm being pivoted from the vehicle roof or a roof-mounted AOS console. The cantilevered arm carries the electronic connections linking the KOZI sensor(s) to the AOS system, the mount also being fixed to the windshield by a zero-force attachment assembly which permits the mounting assembly to be detached for windshield maintenance or replacement without compromising the electronic connections.

BACKGROUND ART

For background on AOS systems see Corrado et al., U.S. Pat. No. 5,482,314. Such systems produce a signal for input to the airbag deployment system (ADS), which if the occupant is out of position (OOP) or in a rear facing infant seat (RFIS) (in the front seat of a vehicle), the deployment of the airbag is aborted, deferred or otherwise controlled. Such deployment systems are known as Smart Airbag Systems (SAS), and may respond to AOS signals by a decision process to: deploy or not (abort deployment), or modify deployment for dual phase airbags, multiphase, or for partial or controlled rate inflation airbags.

Recent studies have revealed that there is a class of slow speed automotive accidents causing injury to children, youngsters and frail adults. This usually occurs when the $\Delta V$ of the "crash" is 18 miles per hour or less, where the occupant is unbelted or in an RFIS and the driver jams on the brake. The airbag deployment sensor experiences a G-force great enough to signal deployment. Typically, in the low speed accident, the child has slid, or is sliding forward into the Instrument Panel (IP) when the airbag deploys. The airbag deployment injures the child because it is too close, having intruded into the Keep Out Zone (KOZ).

Our co-pending application Ser. No. 08/957,730, filed Oct. 23, 1997, entitled KEEP OUT ZONE INCURSION FAST SENSING MODE FOR AIRBAG DEPLOYMENT SYSTEMS, now U.S. Pat. No. 6,249,729, issued Jun. 19, 2001 discloses a KOZI sensing system applicable to the present invention. This application relates to AOS systems for sensing the nature or type of occupant and the location of the occupant with respect to the vehicle interior, and more particularly the occupant seat and dashboard or instrument panel to develop a signal usable by the ADS.

The AOS and KOZI sensors may employ various sensor means. For example ultrasonic active transmission/reception sensors and infrared passive sensors may be used, either alone or in combination. Specific "zones" of the vehicle interior are sampled by each system with respect to a front passenger seat: the AOS sensor detecting the occupancy state of the passenger seat area; and the KOZI sensor detecting the incursion status of a "keep-out zone", generally defined by an area near the instrument panel forward of the passenger seat. In view of the different sampling target zones, these types of sensors have different mounting orientation requirements. The AOS electronics may be located in a console mounted in or on the headliner or header. The AOS and KOZI sensors may be mounted in the console or some other location in the interior, in which case they are connected to the console signal processing electronics by wiring in the headliner. The usual places for mounting of the AOS sensors, including a look-down KOZI sensor, are in the headliner or on the IP.

Automotive rear-view mirrors and their mounting brackets present a possible location for mounting sensors, particularly KOZI sensor(s). However, several problems for this location arise from the design and construction of conventional rear-view mirrors. In modern automobiles the mirror is typically independently supported by a bracket glued or bonded to the front windshield. This does not provide a protected path for wiring leading from the sensors to the AOS console as wiring bonded to the windshield is very vulnerable to physical wear and solar damage. In addition, such wiring would likely be damaged and require replacement in the event that the windshield is replaced, adding to the cost, time and inconvenience of windshield repair and AOS maintenance, particularly the calibration of these sensitive instruments. In addition, the sensors themselves may be damaged and/or become misaligned in the process of removing the mirror and its re-mounting during windshield replacement.

SUMMARY, OBJECTS AND ADVANTAGES

This invention includes the following features, functions, objects and advantages in an improved automotive mirror mounting system for use with an AOS/KOZI sensor system A mounting which: is simple to install; is suitable for mounting KOZI and/or sensors; provides a protected path for wiring connecting such sensors with an AOS console mounted on the headliner; is quickly removable from the windshield to allow windshield replacement or maintenance; can be removed without applying substantial force to the mounting, thus reducing the likelihood of damage to the sensors; and is replaceable in precise orientation for proper alignment to look at a specified zone. Other objects and advantages will be evident from the description, drawings and claims.

The mirror mount of the invention comprises a cantilevered arm pivotally connected at its upper, rearward end in a first embodiment to an AOS console mounted in or on the headliner adjacent the windshield header. The arm spans forward and downward to a mirror mounting bracket to which it is permanently or removably mounted. The mirror mounting bracket in turn is removably fastened at its base to the windshield below the windshield header. This removable fastening is preferably a zero-force alignment/attachment assembly, which in a principal embodiment includes an attachment button glued to the inside of the windshield.

The cantilever arm and mirror mounting bracket may be formed as separate components joined by suitable fasteners or bonding means, such as set screws, bolts or glue, or the arm and bracket may be integrally formed. The arm, bracket and zero-force alignment/attachment assemblies may be formed of conventional materials used for such automotive accessories, such as machined or molded aluminum, polymers or composites.

The mirror mounting bracket includes an adjustable attachment, such as a ball joint, for a rearview mirror on the aft-facing surface of the bracket. The bracket is also provided with at least one mounting pad or location suitable for mounting KOZI and/or other types of AOS sensors. Preferably there is a mounting pad for a KOZI sensor(s) located on the underside of the bracket adjacent the attachment to the windshield. Installed at this location, the sensors can be oriented to sample the incursions into the Keep-Out-Zone in the area lying generally below the mirror mounting assembly. Optionally, AOS and/or KOZI sensors may be built in the mirror itself Both the cantilever arm and mounting bracket contain a channel or internal conduit for sensor wiring communicating with the AOS console at one end and with the sensor mounting pad(s) and the mirror at the other.

In an alternative embodiment, the cantilever arm may connect at its upper, rearward end to a pivotal mounting plate in or on the headliner adjacent the windshield header, and the wiring located in the conduit or channel in the arm may communicate with wiring located between the headliner and the roof, leading to the AOS console. The pivotal mounting plate may be secured to the header or be an integral or discrete part of the AOS console.

The zero-force attachment assembly of the preferred embodiment of the invention comprises a gripping member such as a flanged spring attached to the base of the mounting bracket facing the windshield, the spring in turn releasably gripping a beveled attachment button which is bonded or glued to the inner surface of the windshield below the windshield header The button is shaped with beveled sides shaped to match the shape of the in-turned flanges of the spring to provide a secure gripping surface.

The flanged spring is a leaf spring formed approximately as a hooked "W" with inward and upward facing flange-like extensions at the right and left ends of the "W". The spring is flexibly clamped to the bracket base by a pair of parallel, spaced fulcrum bars mounted on the base parallel to the base surface, the spring being inserted to nest in the gap between the base and bars with the flange extensions facing the windshield and attachment button.

A bore is formed through the bracket running from the bracket base immediately beneath the center of the spring perpendicularly through the bracket body and opening on the rearward side of the bracket. A shaft-like releasing tool is inserted through the bore and pressed to impinge on the bottom of the spring, causing it to flex between its contacts with the fulcrum bars. The spring flexure in turn causes the flange extensions to rotate outwards to release the button. The entire mounting bracket may then be rotated about the cantilever arm pivot to move away from the windshield.

Windshield replacement, or initial installation, will only require the usual step of gluing or bonding a new or reused button to the new windshield. The reverse operation may be performed to re-attach the bracket to the button. After pivoting the bracket to re-contact the button, the removal of the releasing tool permits the flange extensions to rotate inwards to grip the beveled sides of the button securing the bracket in place relative to the windshield.

BRIEF DESCRIPTION OF DRAWINGS

The invention is described in more detail in the accompanying drawings, in which.

DETAILED DESCRIPTION OF THE BEST MODE FOR CARRYING OUT THE INVENTION

The following detailed description illustrates the invention by way of example, not by way of limitation of the principles of the invention This description will clearly enable one skilled in the art to make and use the invention, and describes several embodiments, adaptations, variations, alternatives and uses of the invention, including what is presently believe to be the best mode of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

Figure 1A:
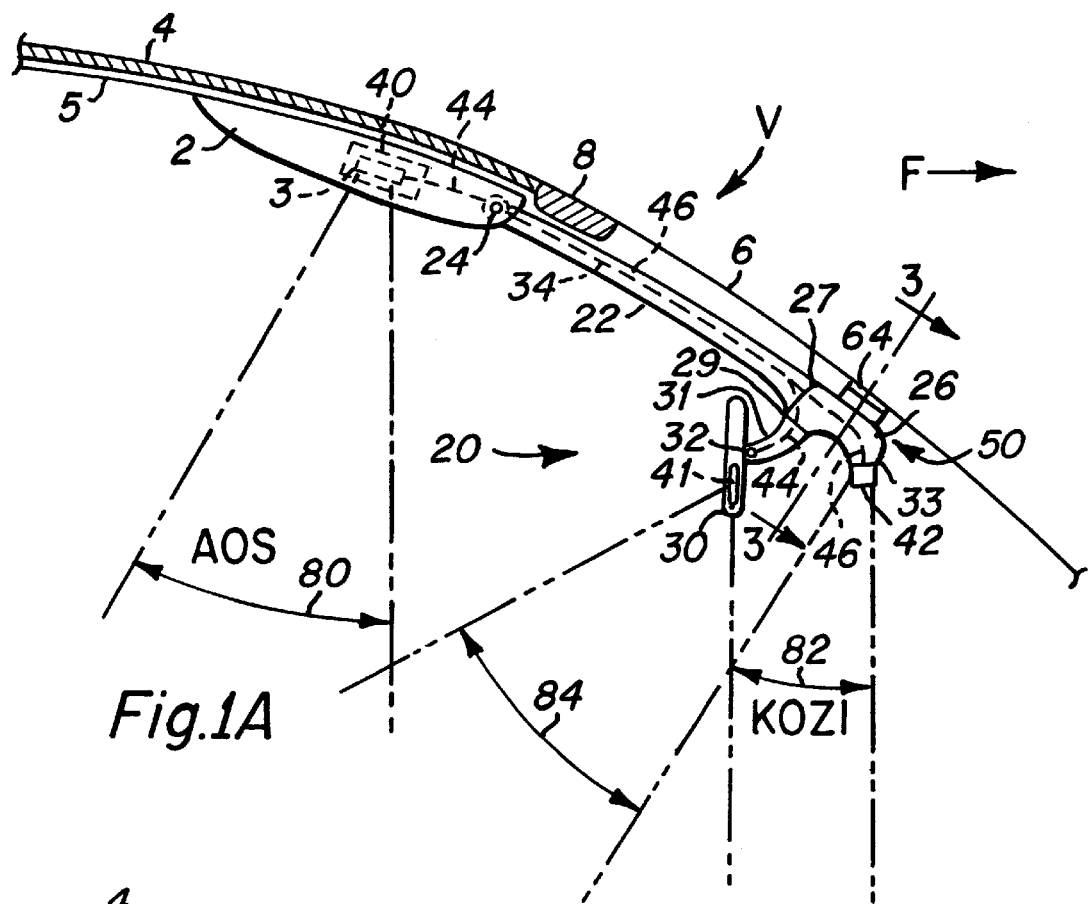
FIGS. 1A and 1B are side elevation views of the mirror mount of the invention, showing the windshield header, AOS console and portions of the windshield, roof and headliner, FIG. 1A showing the mirror mount attached to the windshield and FIG. 1B showing the mirror mount detached from the windshield and rotated downward.
Figure 1B:
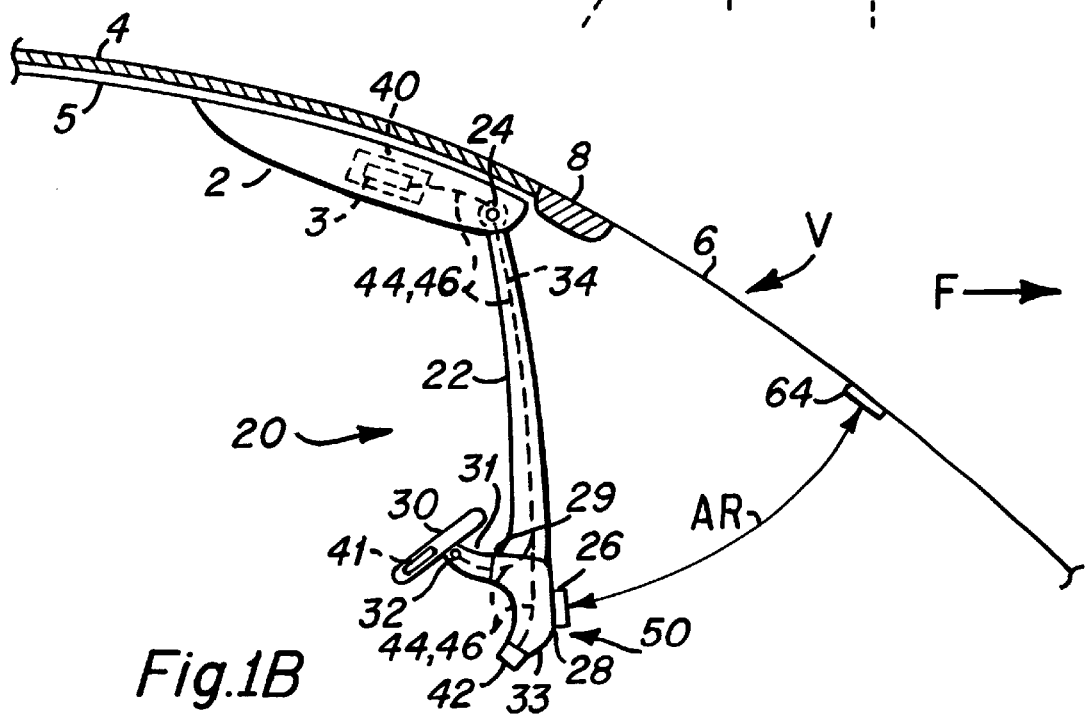
Figure 4:
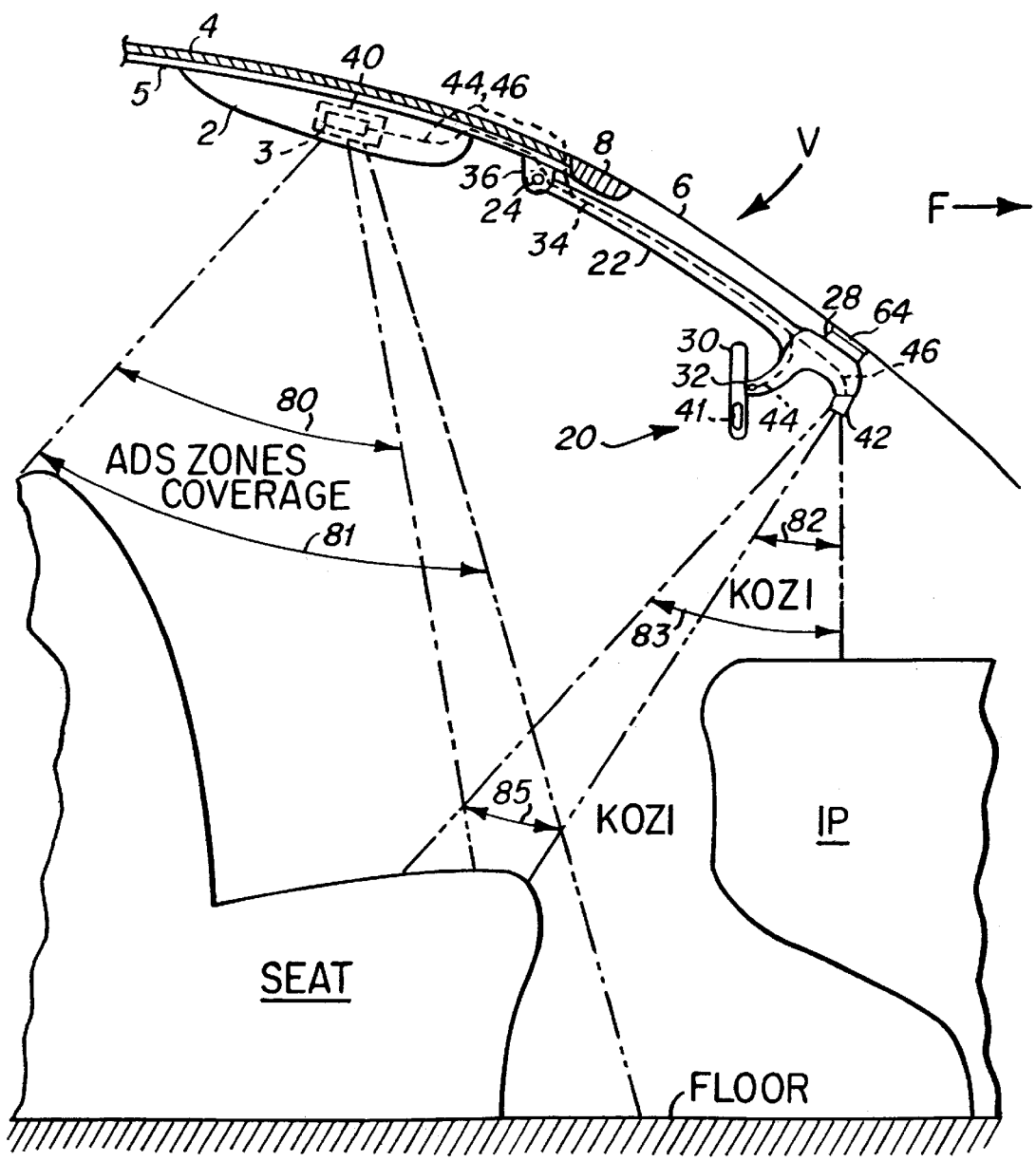
FIG. 4 is a side elevation view an alternate embodiment of the mirror mount of the invention showing the AOS and KOZI sensor scan zones.

A number of the components and subassemblies of the mirror mount assembly embodiments shown in the following figures are preferably disposed substantially symmetrically about a vertical plane of symmetry substantially parallel and adjacent to the vehicle center line. This plane is referred to herein as the "centerline" (C/L) of the mirror mount assembly, and for simplicity and clarity corresponding parts or elements on each side of the centerline may be referred to by the same label numbers with the label for one side distinguished by an apostrophe. In FIGS. 1A, 1B and 4 this plane is parallel to the plane of the paper.

FIGS. 1A and 1B are side sections of the mirror mount of the invention as installed in an automobile, sectioned along a line adjacent the vehicle center line and show portions of the front seat passenger area of vehicle V, with the vehicle forward direction indicated by Arrow F, and show portions of the front windshield 6, roof 4 and ceiling headliner 5 of the vehicle. An AOS console 2 is installed on the undersurface of the headliner 5 at a point on or adjacent to the vehicle centerline and adjacent the rear margin of the windshield header 8. It contains AOS sensors 40 and electronics 3. The windshield 6 slopes diagonally downward from header 8 towards the lower right of FIG. 1A. The AOS and KOZI sensor fields of view are identified by AOS field 80 and KOZ field 82 between the angled dashed lines, respectively, with the KOZI sensor being item 42.

The mirror mount assembly 20 comprises a mirror mounting bracket 26 which is releasably attached at bracket base slot 28 (see FIG. 2) to the inside surface of windshield 6 at a point on or adjacent to the vehicle center line and medial to the windshield header 8 and the windshield lower edge (not shown). The point of attachment of mounting bracket 26 to the wind shield 6 is selected, as in conventional mirror mounts, to provide a suitable mirror position for driver rearward vision The mounting bracket 26 is fixedly attached at arm junction 27 to the lower end of an elongated cantilever arm 22, the arm junction 27 being above and rearward of base 28 at a point adjacent to windshield 6. Cantilever arm 22 spans between the upper mirror bracket 26 junction 27 and the forward edge of AOS console 2 and is there pivotally connected by pivot 24. Cantilever arm 22 lies adjacent to and generally parallel the inner surface of windshield 6 and is substantially parallel to the vehicle centerline.

The mounting bracket 26 is also fixedly attached at mirror support junction 29 to one end of mirror support 31, the support junction 29 typically being below and adjacent to arm junction 27. Both the cantilever arm 22 and mirror support 31 may be integrally formed with mounting bracket 26, or may be formed as distinct elements and attached by suitable fasteners or bonding, such as set screws and sockets, threaded junctions or adhesives. The other end of mirror support 31 includes an adjustable fastener or attachment 32, such as a ball joint or pivot, which in turn is adjustably fixed to rearview mirror 30.

The mounting bracket 20 preferably has at least one mounting pad or projection 33 on which is fixedly mounted a KOZI and/or AOS sensor(s) 42, the mounting pad 33 preferably being located on the underside of bracket 26 adjacent to the windshield 6, so that the KOZI sensor 42 is oriented generally downward and aimed towards the KOZ gap between the vehicle seat and the vehicle dashboard as shown between the angled dashed lines, which KOZ spans between Arrows 82 in FIGS. 1A and 4.

In addition, or as an option, AOS and/or KOZI sensor(s) 40 can be mounted on or within the mirror 30 corresponding AOS and/or KOZ scan or look zone in area 84.

Figure 2:
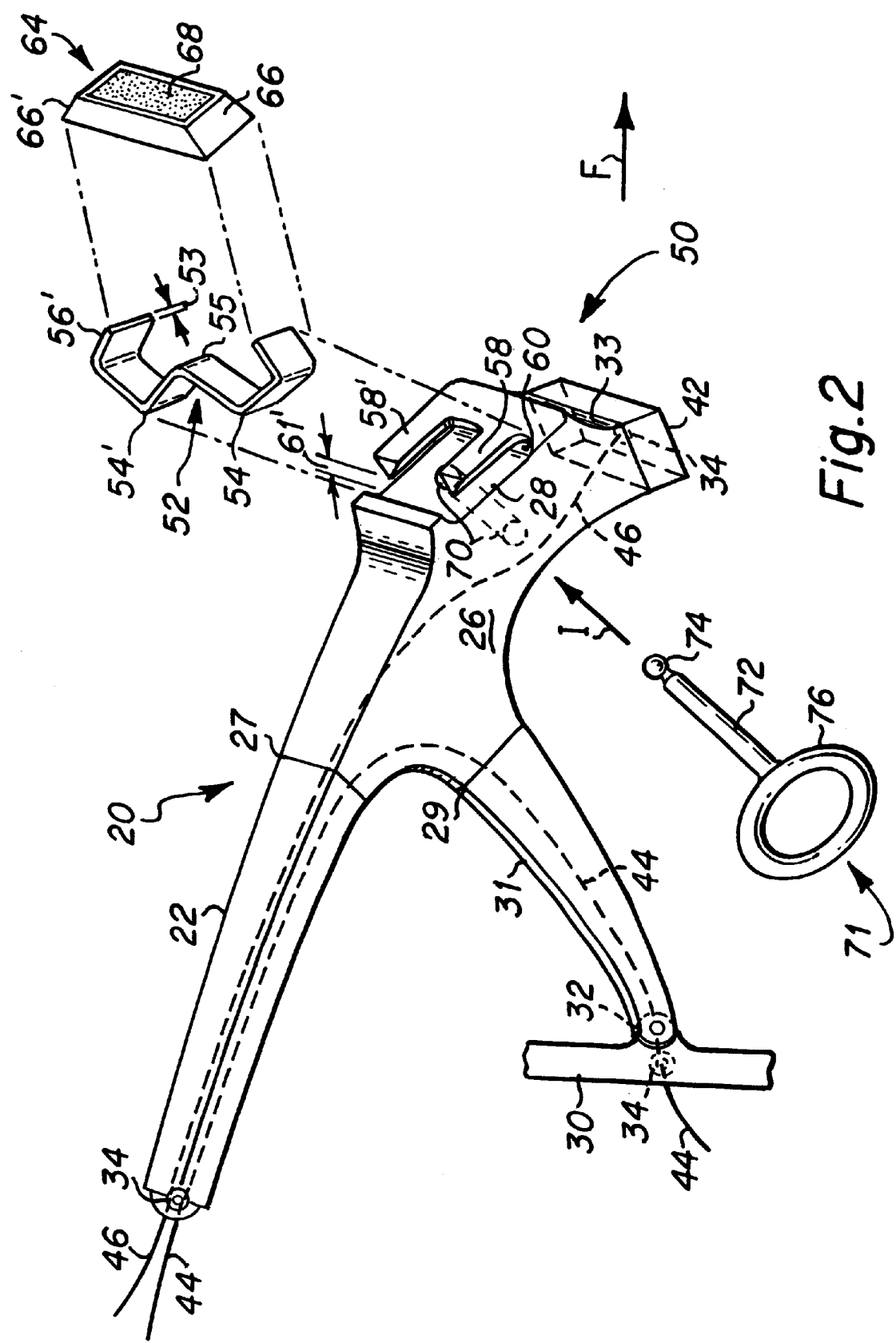
FIG. 2 is an isometric view of the mirror mount showing in exploded view the elements of a representative embodiment of the zero-force attachment assembly.
Figure 3A:
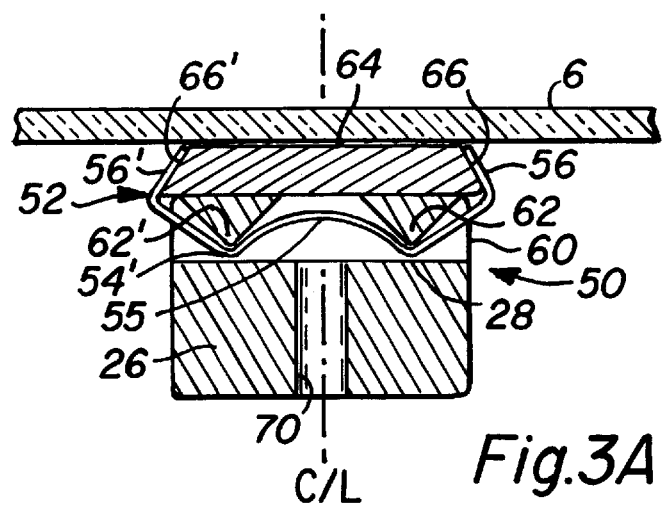
FIGS. 3A and 3B are cross-sectional views of the mounting bracket in a plane perpendicular to the windshield through the zero-force attachment assembly as indicated by line 3—3 in FIG. 1A, with FIG. 3A showing the bracket attached to the windshield, and FIG. 3B showing the bracket in the released configuration.
Figure 3B:
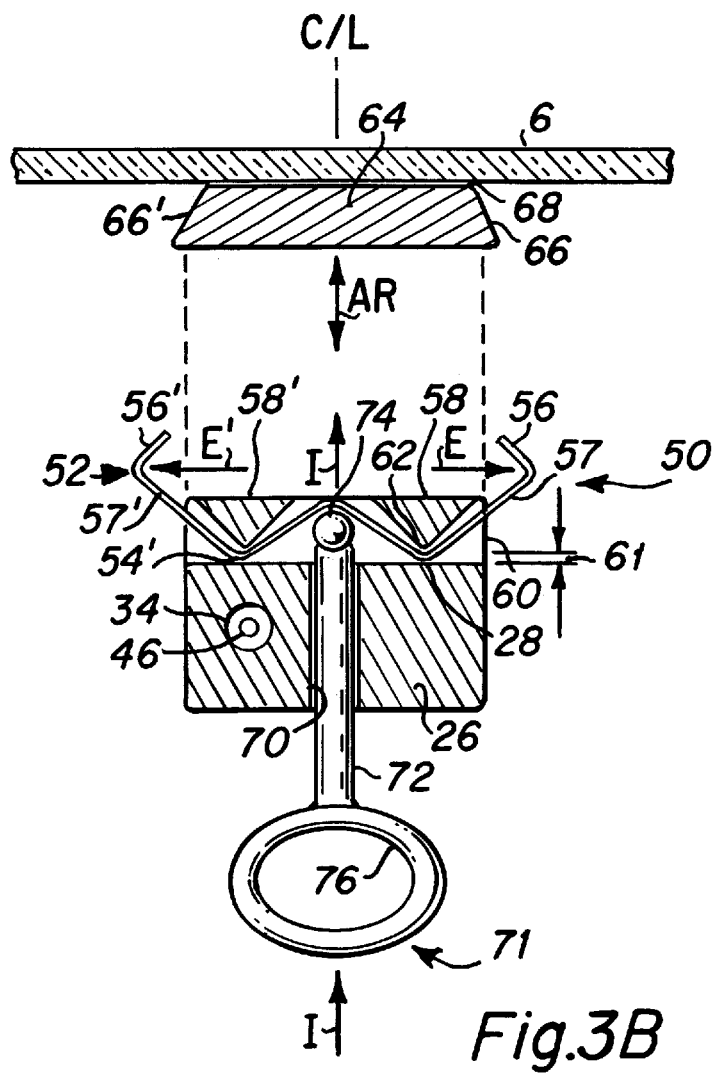

As can also be seen in FIGS. 2 and 3B, a continuous channel or internal conduit 34 runs through the interiors of bracket 26 and cantilever arm 22 so as to communicate with the interior of AOS console 2. The conduit 34 also is bifurcated within the bracket 26 to: 1) lead through arm junction 29 along mirror support 31 to communicate with mirror 30 and AOS sensor 41; and 2) lead through the interior of bracket 26 to pad 33 to communicate with KOZI sensor 42. The conduit 34 carries the AOS/KOZI sensor wiring 44 and the KOZI sensor wiring 46 which connects these sensors with the AOS console electronics 3, shown schematically in FIGS. 1A and 1B. Conventional flexible wiring connectors may be employed to protect the wiring 44,46 adjacent to pivot 24 and mirror attachment 32, the wiring then extending within the console 2 to connect to the AOS electronics 3. The conduit 34 may be molded, extruded, machined or bored, or alternatively the arm 22, bracket 26 and support 31 may be formed as hollow structures with communicating interior spaces.

FIG. 1B shows the bracket base 28 released and detached from windshield 6 to allow the mounting assembly 20 to be rotated about pivot 24 as indicated by Arc Ar. This removable fastening of the bracket base 28 is preferably by means of a zero-force attachment assembly 50 which releasably grips or clamps to an attachment button 64 which is fastened to the windshield, preferably by adhesive bonding.

FIG. 2 is an exploded isometric view of a portion of the mirror mount assembly 20 showing the elements of the zero-force attachment assembly 50, the mirror support 31 and portions of the cantilever arm 22 and mirror 30. FIG. 3A and 3B are cross-sectional views of the mounting bracket 26 in a plane perpendicular to the windshield 6 through the zero-force attachment assembly 50 as indicated by line 3—3 in FIG. 1B, with FIG. 3A showing the bracket 26 attached to the windshield, and FIG. 3B showing the bracket in the released configuration.

Considering FIGS. 2, 3A and 3B together the attachment assembly 50 comprises a gripping spring 52, such as a ribbon or leaf type spring bent or formed to the shape of a hooked "W", defined by a concave downward-opening curved portion 55 located at the mid-portion of the spring. This center portion is medial to right and left concave upward-opening segments 54, 54', which are in turn bounded on the outside by right and left outward facing arms 57, 57'. The distal end of each arm 57, 57' is bent inwardly to form a claw-like flange 56, 56'.

The spring 52 is flexibly received in the bracket base slot 28 of bracket 26 by two elongated spring fulcrum bars 58, 58' which are fixedly attached to a spacer lip 60, an extended portion of the base 28 which extents outwardly and upwardly from the lower edge of base 28 towards the windshield (in the installed configuration). The fulcrums 58, 58' lie generally parallel and adjacent to the surface of base 28 spanning upwardly substantially parallel to the vehicle centerline. As can best be seen in FIG. 3B, the inner side (facing the base 28) of each bar is shaped as a blade 62 of approximately triangular section and is spaced from the surface of base 28 by a clearance gap 61 approximately equal to the leaf thickness 53 of spring 52. As installed in the attachment assembly 50, the spring side segments 54, 54' flexibly nest in gap 61, 61' between fulcrum blades 62, 62' and base 28. The gap 61, 61' and the taper of blades 62, 62' are selected so that the spring in secured but free to flex.

The flanges 56, 56' extend beyond (forward towards the windshield) the base 28 Bore 70 extends through the bracket 26 parallel to the centerline C/L and perpendicular to the base 28 to open towards the spring center portion 55; and Attachment button 64 is fixed to the inner surface of windshield 6 by glue or adhesive pad 68, with the right and left sides 66, 66' bevelled or undercut so that they slope towards the centerline in the direction of button/windshield Junction. As can be seen in FIG. 3A, in the attached configuration outer faces of the fulcrums are in contact with the surface of button 64 and the flanges 56, 56' of spring 52 lie in contact with and parallel to the bevelled sides 66, 66' of the button 64. The initial tension and shape of the spring 52 and the taper of the bevelled sides 66, 66' is selected so that the flanges 66, 66' securely grip the sides of the button 64. Note that the depth of the center portion 55 is substantially less than the depth of lip 60 so that substantial clearance is present between the center section and the button 64 in this configuration.

In operation, the attachment assembly may be released as shown in FIG. 3B to allow the mirror mount assembly to pivot away from the windshield (see FIG. 1B) as indicated by Arrow AR by the insertion of a shaft-like releasing tool 71 through bore 70 (see also FIG. 2 ). The releasing tool 71 preferably comprises a shaft 72 terminating in a ball portion 74 at the insertion end, and terminating in a ring shaped handle 76 at the opposite end. As the tool 71 is inserted fully into bore 70 in the direction shown as Arrow I, the ball portion 74 bears on the surface of the spring center portion 55 and causes the spring center portion to flex outward towards the button 64, in turn causing the spring to rotate over fulcrum blades 62, 62' so that side legs 57, 57' and flanges 56, 56' rotate or expand away from the centerline as indicate by Arrow E and E. The release tool 71 is pressed against the spring until spring flexure is sufficient to cause the flanges to release the grip on the button 64 and allow the now-opened flanges to clear the edges of the button sides 66, 66' as the bracket 26 is pivoted away from the windshield 6. Once the bracket has pivoted away from the windshield, the release tool 71 may be removed.

The bracket 26 may be re-attached by repeating the operation with the bracket being pivoted back into contact with the button 64 when the tool 71 fully inserted in bore 70 to spread the flanges 56 open. Re-attachment is completed by removing the tool to allow the spring to relax, closing the flanges back into contact with the button sides.

The above described attachment assembly 50 is termed a "zero force attachment assembly" in that no substantial force need be applied, by hand or other means to either the bracket 26 or the arm 22 to release or re-attach the bracket to the windshield, as would be the case with a conventional pressure snap-fit attachment. The force applied by tool 71 to spring 52 is transmitted directly to the fulcrums 58, which in turn rest directly on the attachment button 64, which in turn is fixed to the windshield 6.

As an alternative to the custom releasing tool shown, other tools with comparable shapes may be used to effect release/reattachment In addition, an alternative embodiment of the attachment assembly 50 may be constructed in which the spring/button/fulcrum combination is in a rotated orientation about an axis perpendicular to the windshield as compared to the embodiment of FIGS. 2, 3A and 3B without departing from the principles of the invention.

It should be understood that the attachment assembly 50 of FIGS. 2, 3A and 3B is merely exemplary, and any suitable removable/releasable attachment may be employed, including screws or other types of zero-force attachment members to tether the mounting bracket to the window for stability. The final design is well within the skill in the art and undoubtedly manufacturing, assembly and maintenance considerations will play a large part, or dictate, the optimum configuration.

FIG. 4 is a side elevation view an alternate embodiment of the mirror mount of the invention generally the same in form and function to the embodiments shown in FIGS. 1A and 1B, except that the cantilever arm 22 pivotally connects at its upper, rearward end to pivot 24 which is mounted a discrete pivot plate 36 rather than directly on the AOS console 2. This permits flexibility in the use of the mirror mount assembly of the invention in vehicles in which the AOS console 2 is not located directly adjacent the windshield header 8, or is located substantially away from the vehicle center line. The AOS and KOZI wiring 44, 46 may extend from end of conduit 34 in a path underneath the headliner to the AOS console electronics 3. Note that the AOS zones coverage 80, 81 can range in width, as can the KOZ zones 82, 83 The alternative zone from mirror location 41 is not shown in FIG. 4 to prevent clutter in the figure. Note that there can be some overlap 85 between the AOS and KOZ zones.

INDUSTRIAL APPLICABILITY

It is clear that the mirror mount assembly of this invention has wide industrial applicability to AOS systems in which it is desired to mount AOS sensors, including KOZI sensors, on the rear view mirror or its associated mounting, particularly when the AOS electronics console in located adjacent the windshield near the vehicle centerline. The advantage of a zero force mount point on the windshield and protected conduit for AOS wiring so that the AOS electronics, sensors, and wiring are not vulnerable to damage upon windshield repair or replacement, makes the design of the present invention particularly practical and enhances the maintenance and reliability of the AOS system. Indeed, the windshield button in combination with the zero-force mount provides a particularly good alignment guide and location point for the sensors. For replacement of the window, the button can be gripped in the flanges before application to the windshield, glue (e.g. Super glue) applied to the face 68 (FIG. 2) of the button, and the button positioned in proper location on the inside of the windshield by pivoting arm 22 forward so the button/glue contacts the window. It is held there momentarily until the glue sets for adequate bond strength. This produces a precise mounting location upon window replacement, something that is not otherwise possible in the field. That is, the mirror-mounted AOS sensor(s) are self-aligning upon maintenance or replacement.

It should be understood that various modifications within the scope of this invention can be made by one of ordinary skill in the art without departing from the spirit thereof We therefore wish our invention to be defined by the scope of the appended claims as broadly as the prior art will permit, and in view of the specification if need be.

NOTICE: This Parts List is provided for informational purposes only. It is not a part of the official Patent Application, and is to be deleted at the time of issuance by the Examiner.

PARTS LIST

V Vehicle or automobile)
CIL Automobile centerline
Arrow F vehicle forward direction
Arrow AR Attach/release direction
Arrow I Tool insertion direction
Arrow E Claw expansion direction
2 AOS console
3 AOS electronics
4 Car roof
5 Ceiling headliner
6 Windshield
8 Windshield header
20 Mirror mounting assembly
22 Cantilever arm
24 Console pivot
26 Mounting bracket
27 arm upper junction
28 Bracket base slot
29 Arm lower junction
30 Mirror
31 Mirror support
32 Mirror attachment
33 KOZI sensor pad
34 Wiring conduit
36 Roof pivot
40 AOS sensor(s)
41 Alt AOS
42 KOZI sensor(s)
44 AOS sensor wiring
46 KOZI sensor wiring
48 Headliner wiring
50 Zero force attachment assembly
52 Gripping Spring
53 Spring thickness
54 Spring side segments
55 Spring center portion
56 Spring flanges
57 Spring side arms
58 Fulcrum
60 Spacer lip
61 Fulcrum gap or clearance
62 Fulcrum blade
64 Attachment button
66 Button bevelled sides
68 Adhesive pad or glue
70 Tool insertion bore 71 Release tool
72 Tool shaft
74 Tool ball
76 Tool pull ring
80 AOS Field
81 Alt AOS Field
82 KOZI Field
83 Alt KOZI Field
85 Overlap in Zones

We claim:

1. A vehicle rear view mirror and sensor mount assembly for AOS and KOZI sensors, said mount assembly for use in a vehicle having a ceiling headliner-mounted AOS console disposed adjacent the header of the vehicle windshield and adjacent the vehicle centerline, said mirror and sensor mount assembly comprising in operable combination:
    a) a rear view mirror mounting-bracket releasably attachable to said windshield adjacent said vehicle centerline;
    b) an elongated cantilever arm fixedly attached at a first end to said mounting-bracket and which arm includes a pivotal connector at a second end for pivotal mounting of said arm adjacent said header so that said arm and said mounting-bracket may be rotated away from said windshield upon release of said mounting-bracket from said windshield;
    c) said mounting-bracket includes a rear view mirror support member;
    d) at least one of an AOS sensor and a KOZI sensor attached to at least one of said mounting-bracket and said mirror support member; and
    e) said arm includes a continuous internal electronic wiring conduit communicating between said at least one sensor and said AOS console to operatively connect said AOS console with said at least one sensor.

2. A vehicle rear view mirror and sensor mount assembly as in claim 1, wherein:
    a) said mirror support member is adapted to house said at least one of an AOS sensor and a KOZI sensor;
    b) said continuous internal conduit communicates with said at least one sensor through said mirror support member; and which includes:
    c) electronic wiring for operatively connecting said at least one sensor to said AOS console.

3. A vehicle rear view mirror and sensor mount assembly as in claim 1, wherein:
    a) said mounting-bracket is releasably fixed to said windshield by a zero force attachment assembly.

4. A vehicle rear view mirror and sensor mount assembly as in claim 1 wherein said pivotal connector is disposed in an AOS console.

5. A vehicle rear view mirror and sensor mount assembly as in claim 1 wherein:
    a) said pivotal connector includes a pivot plate fixedly mounted to said vehicle adjacent said windshield header generally on said centerline.

6. A vehicle rear view mirror and sensor mount assembly as in claim 5 wherein said pivot plate is part of an AOS console.

7. A vehicle rear view mirror and sensor mount assembly as in claim 6, wherein:
    a) said mounting-bracket is releasably fixed to said windshield by a zero force attachment assembly.

8. A vehicle rear view mirror and sensor mount assembly as in claim 4, wherein:
    a) said mounting-bracket is releasably fixed to said windshield by a zero force attachment assembly.

9. Method of locating and aligning an AOS sensor in a vehicle interior, said vehicle interior including a windshield surface and a windshield header, comprising the steps of:
    a) positioning an AOS sensor on a mounting member portion of a rear view mirror bracket;
    b) mounting said mirror bracket on a first end of an elongated arm that is pivotally mountable at a second end of said arm adjacent the windshield header in a vehicle;
    (c) releasably securing said mirror bracket to said windshield surface to precisely locate and align said sensor to look at a predetermined zone of said vehicle interior.

10. Method as in claim 9 wherein said sensor is a KOZI sensor and said positioning step includes aiming said KOZI sensor to view a predetermined selected zone in said vehicle.

11. Method as in claim 9 which includes the steps of securing a button member to said windshield surface, providing a zero force engagement member; and wherein said step of releasably securing includes attaching said mirror bracket to said button member via said zero force engagement member.

12. Method as in claim 11 wherein said sensor is a KOZI sensor.

13. A mount for mounting an AOS sensor in the interior of a vehicle in a precise location on a windshield surface with proper alignment to view a predetermined selected zone of said interior, comprising:
    a) a rear view mirror bracket having a bracket base, a pivotable mirror holder, and an AOS sensor mount base as a part thereof;
    b) an elongated arm pivotally mountable at one end adjacent a windshield header member and adapted at its other end to be secured to said mirror bracket; and
    c) a zero force mounting assembly for securing said mirror bracket to said windshield.

14. A mount as in claim 13 wherein said AOS sensor is a KOZI sensor.

15. A mount as in claim 14 wherein said KOZI sensor mount base is disposed on said bracket base.

16. A mount as in claim 13 wherein said sensor mount base is oriented so that an AOS sensor mounted thereon points toward at least one of a KOZ or vehicle seat.

17. A mount as in claim 16 wherein said sensor mount base is disposed on said mirror bracket base.

18. A mount as in claim 17 wherein said sensor is pointed at a KOZ.

19. A mount as in claim 17 wherein said sensor mount base is disposed on said mirror holder.

20. A mount as in claim 19 wherein said sensor mount base is oriented so that an AOS sensor mounted thereon points toward at least one KOZ or vehicle seat.

* * * * *

UNITED STATES PATENT AND TRADEMARK OFFICE
CERTIFICATE OF CORRECTION

PATENT NO.   : 6,318,697 B1
DATED        : November 20, 2001
INVENTOR(S)  : Anthony P. Corrado and Thomas Lehnst It is certified that error appears in the above-identified patent and that said Letters Patent is hereby corrected as shown below:

<u>Title page,</u>
Item [73], should read -- Assignees:   Robert Bosch Corporation
Farmington Hills, MI (US); and

Volkswagen AG,
Wolfsberg, Germany (DE) --

Signed and Sealed this

Eighth Day of October, 2002

*Attest:*

*Attesting Officer*

JAMES E. ROGAN
*Director of the United States Patent and Trademark Office*